United States Patent
Yu

(10) Patent No.: US 8,654,277 B2
(45) Date of Patent: Feb. 18, 2014

(54) LIQUID CRYSTAL DISPLAY MODULE, BACKLIGHT MODULE AND BACK PLATE THEREOF

(75) Inventor: Gang Yu, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 190 days.

(21) Appl. No.: 13/220,295

(22) Filed: Aug. 29, 2011

(65) Prior Publication Data

US 2012/0013822 A1    Jan. 19, 2012

Related U.S. Application Data

(63) Continuation of application No. PCT/CN2010/079503, filed on Dec. 7, 2010.

(30) Foreign Application Priority Data

Jul. 14, 2010   (CN) .......................... 2010 1 0230811

(51) Int. Cl.
*G02F 1/1335* (2006.01)

(52) U.S. Cl.
USPC .................... 349/62; 349/58; 349/59; 349/60

(58) Field of Classification Search
USPC ................................................ 349/58–60, 62
See application file for complete search history.

(56) References Cited

U.S. PATENT DOCUMENTS

2010/0208160 A1 *   8/2010   Park et al. ....................... 349/58

FOREIGN PATENT DOCUMENTS

| CN | 101354496 A | 1/2009 |
|----|-------------|--------|
| CN | 101649974 A | 2/2010 |
| CN | 101770111 A | 7/2010 |
| JP | 2005284106 A | 10/2005 |
| TW | 201003226 A | 1/2010 |

* cited by examiner

*Primary Examiner* — Phu Vu
(74) *Attorney, Agent, or Firm* — Soroker-Agmon

(57) ABSTRACT

The present invention discloses a liquid crystal display module, a backlight module and a back plate thereof. The back plate has a back-plate mainbody disposed on a bottom of the backlight module, and two bent structures integrally and symmetrically arranged on two opposite sides of the back-plate mainbody for supporting an optical film assembly of the backlight module. The present invention is applied to a LCD module with a separate-type backlight module design for saving the used number of housing strips, simplifying the structure of the backlight module, and enhancing the stability thereof.

11 Claims, 2 Drawing Sheets

LIQUID CRYSTAL DISPLAY MODULE, BACKLIGHT MODULE AND BACK PLATE THEREOF

FIELD OF THE INVENTION

The present invention relates to a liquid crystal display module, a backlight module and a back plate thereof, and more particularly to a liquid crystal display module, a backlight module and a back plate thereof, wherein the back plate has a design of bent structures.

BACKGROUND OF THE INVENTION

Nowadays, for the convenience of installation and transportation, many components are generally installed into various modules in advance during the mass production of liquid crystal displays (LCDs). For example, a backlight module is constructed by backlight sources and a diffuser plate, and so forth.

With the increase of demands for display devices, the technological development of backlight modules becomes important day by day in recent years, wherein conventional structures of LCD modules in the market generally use an integral design or a separate design. Referring to FIG. 1, a schematic view of a LCD module having a separate-type backlight module according to one embodiment of a traditional technology is illustrate, wherein the LCD module comprises a module frame 10, a liquid crystal panel 20, a housing 30, an optical film assembly 40, a back plate 50 and etc., wherein a plurality of components including the housing 30, the optical film assembly 40 and the back plate 50 construct the separate-type backlight module. However, the housing 30 of the separate-type backlight module is constructed by a pair of first housing strips 31 and a pair of second housing strips 32, all of which are disposed on four sides of the backlight module, so that the housing 30 has too many components and too complicated structures, the installation thereof costs too much manpower and time. In addition, the structure of the separate-type backlight module considerably uses the housing 30, and the size and material of the housing 30 of the backlight module is increased with the diversity of types and sizes of LCD panels. However, various first housing strips 31 and second housing strips 32 of the housings 30 with different sizes can not be shared. Thus, for fabricating these first housing strips 31 and second housing strips 32 of housings 30, new molds must be continuously developed. As a result, the material of the first housing strips 31 and the second housing strips 32 of the housings 30 and the manufacture cost of the backlight module are increased. Meanwhile, when the development cost and time of the backlight module is increased, the material management complexity of the first housing strips 31 and the second housing strips 32 of the housings 30 is also raised.

As a result, the present invention is to provide a liquid crystal display module, a backlight module and a back plate thereof to solve the problems existing in the conventional technologies, as described above.

SUMMARY OF THE INVENTION

A primary object of the present invention is to provide a liquid crystal display module, a backlight module and a back plate thereof, wherein bent structures of the back plate are used to replace some housing strips, so that the use of housing strips can be reduced and thus the manufacture cost thereof can be relatively lowered in comparison with the conventional technologies.

A secondary object of the present invention is to provide a liquid crystal display module, a backlight module and a back plate thereof, wherein the design of the back plate is integrated with functions of a traditional back plate and left/right housing strips, so that the structure of the backlight module can be further simplified, and the stability of installation can be enhanced.

To achieve the above object, the present invention provides a back plate, and the back plate comprises: a back-plate mainbody disposed on a bottom of a backlight module; and two bent structures symmetrically arranged on two opposite sides of the back-plate mainbody for supporting an optical film assembly of the backlight module.

Furthermore, the present invention provides a backlight module, and the backlight module comprises: a back plate comprising a back-plate mainbody and two bent structures, wherein the back-plate mainbody is disposed on a bottom of the backlight module, and the two bent structures are symmetrically arranged on two opposite sides of the back-plate mainbody; an optical film assembly disposed on the bent structures and supported by the bent structures; and a reflective sheet disposed between the optical film assembly and the back-plate mainbody.

Moreover, the present invention provides a liquid crystal display (LCD) module, and the LCD module comprises: a back plate comprising a back-plate mainbody and two bent structures, wherein the back-plate mainbody is disposed on a bottom of the backlight module, and the two bent structures are symmetrically arranged on two opposite sides of the back-plate mainbody; an optical film assembly disposed on the bent structures and supported by the bent structures; a reflective sheet disposed between the optical film assembly and the back-plate mainbody; and a liquid crystal panel disposed on the optical film assembly.

In one embodiment of the present invention, each of the bent structures comprises a first planar plate, a second planar plate and an inclined support plate, wherein the first planar plate is flush and connected with the back-plate mainbody, the second planar plate is parallel to the first planar plate, and the inclined support plate is obliquely connected to an outer side of the first planar plate and an inner side of the second planar plate.

In one embodiment of the present invention, the LCD module further comprises a module frame, and the module frame is used to fix the liquid crystal panel.

In one embodiment of the present invention, each of the other two opposite sides of the back-plate mainbody further comprises a projection structure which is provided with a housing strip, and the projection structure and the housing strip is used to clamp the optical film assembly.

In one embodiment of the present invention, further comprising at least one backlight lamp disposed between the reflective sheet and the optical film assembly.

In one embodiment of the present invention, the backlight lamp is supported on a lamp socket to be positioned on the back-plate mainbody, and the lamp socket is disposed in a space defined by the reflective sheet and the bent structures.

In one embodiment of the present invention, the reflective sheet is obliquely extended upward at portions close to its edges and then horizontally extended outward, wherein a triangular support structure is defined between an inclined portion of the reflective sheet and the bent structure of the back plate.

The advantageous effect of the present invention is that considerable use of left/right housing strips in the traditional technology can be omitted by using the integrated bent structure on the two opposite sides of the back-plate mainbody, so that the manufacture cost of the backlight module can be saved, while the structure of the backlight module can be simplified, more compact, more stable and suitable to various industrial applications.

DETAILED DESCRIPTION OF THE PREFERRED EMBODIMENTS

The structure and the technical means adopted by the present invention to achieve the above and other objects can be best understood by referring to the following detailed description of the preferred embodiments and the accompanying drawings. Furthermore, directional terms described by the present invention, such as upper, lower, front, back, left, right, inner, outer, side and etc., are only directions by referring to the accompanying drawings, and thus the used directional terms are used to describe and understand the present invention, but the present invention is not limited thereto.

Figure 2:
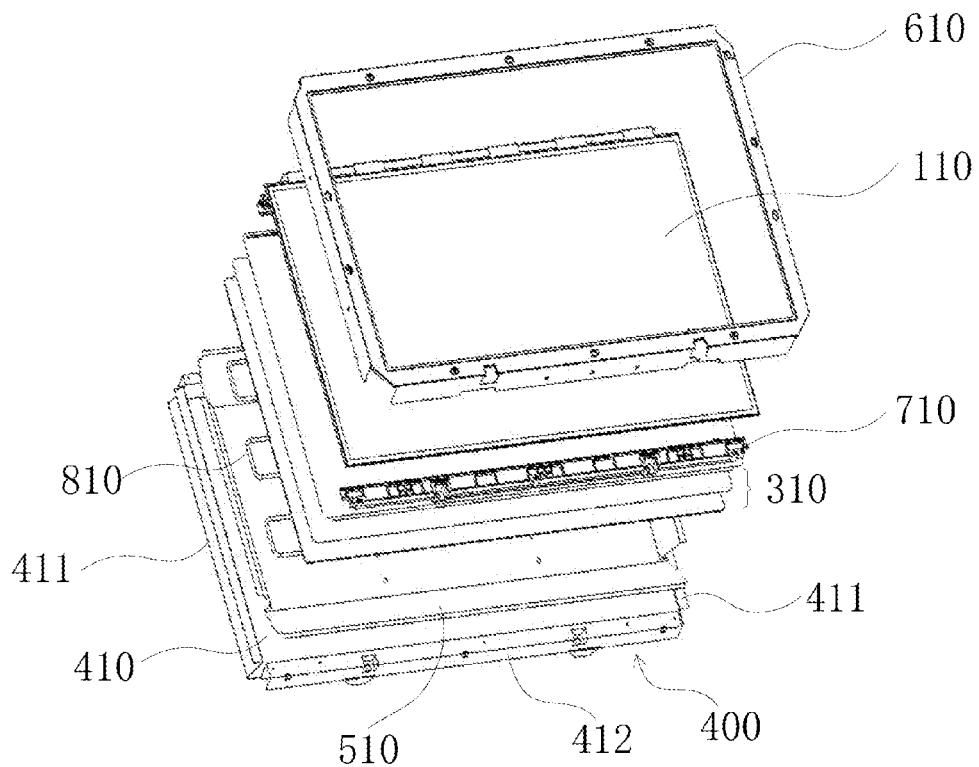
FIG. 2 is an exploded perspective view of a LCD module having a separate-type backlight module according to a preferred embodiment of the present invention.
Figure 3:
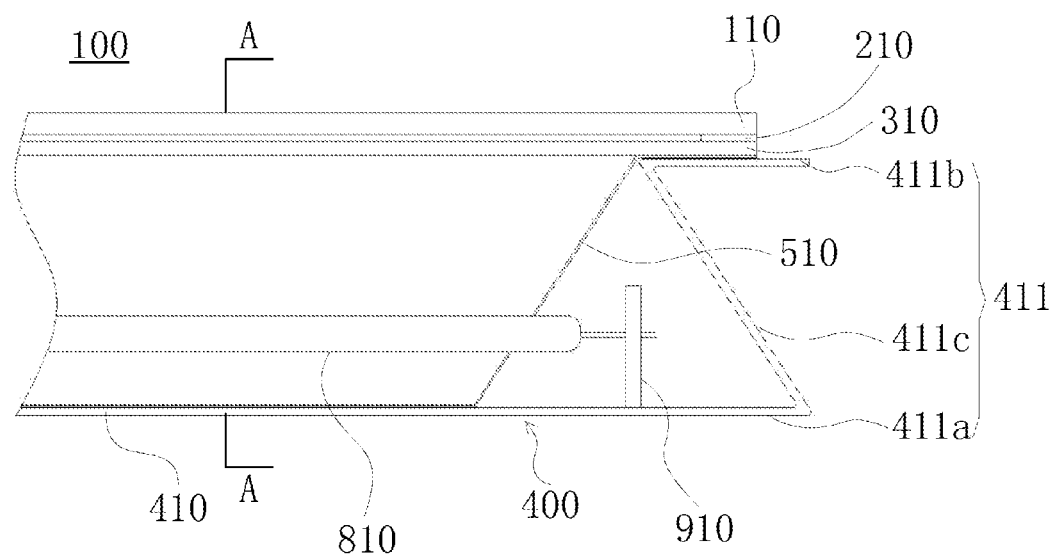
FIG. 3 is a cross-sectional view of a LCD module according to the preferred embodiment of the present invention.
Figure 4:
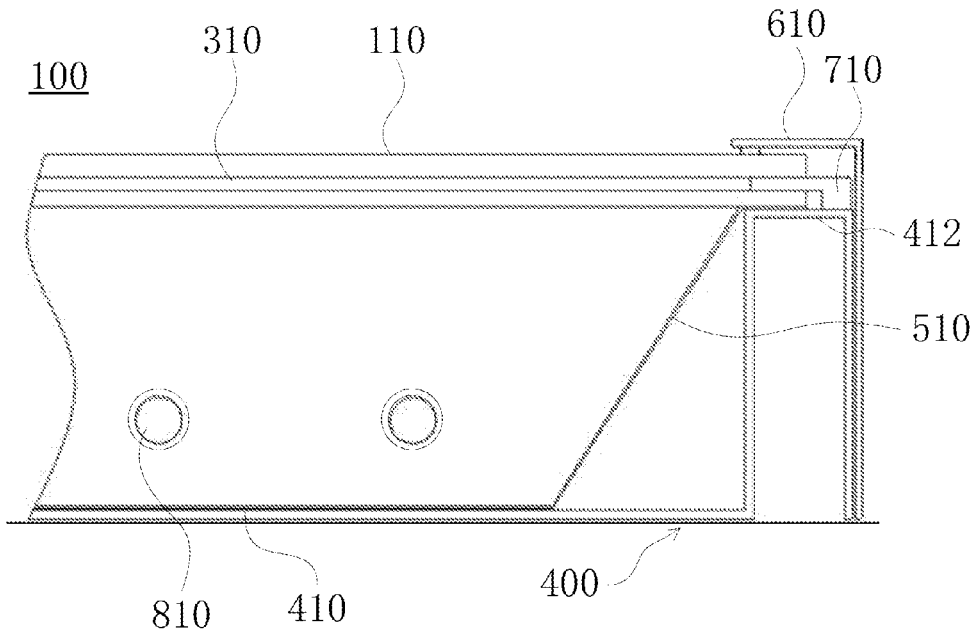
FIG. 4 is a cross-sectional view of the present invention, taken along a line A-A in FIG. 3.

Referring now to FIGS. 2, 3 and 4, an exploded perspective view and cross-sectional views along different directions of a LCD module having a separate-type backlight module according to a preferred embodiment of the present invention are illustrated, wherein a liquid crystal display (LCD) module 100 of the preferred embodiment of the present invention is mainly applied to the field of LCD, and the LCD module 100 comprises: a liquid crystal panel 110 disposed on an upper surface of the LCD module 100; an optical film assembly 310 disposed on a bottom of the liquid crystal panel 110, wherein the optical film assembly 310 is parallel to the liquid crystal panel 110, and a gap space is defined between the optical film assembly 310 and the liquid crystal panel 110 for receiving a spacer 210; a back plate 400 comprises a back-plate mainbody 410 and two bent structures 411, wherein the back-plate mainbody 410 is disposed on a bottom of the LCD module 100, and the two bent structures 410 are integrally and symmetrically arranged on two opposite sides of the back-plate mainbody 410 for supporting the liquid crystal panel 110 and the optical film assembly 310; and a reflective sheet 510 disposed between the optical film assembly 310 and the back plate 400.

Specifically, the optical film assembly 310, the back plate 400 and the reflective sheet 510 can be installed with at least one backlight lamp 810 and at least one lamp socket 910 to commonly construct a backlight module. Furthermore, the liquid crystal panel 110 is parallel to the optical film assembly 310, and a gap space is defined therebetween. In a certain embodiment, the gap space can be used to receive a spacer 210, and the spacer 210 is preferably a plate made of rubber or other elastic buffering material. The optical film assembly 310 preferably comprises a diffuser plate, a diffuser sheet, a prism plate and etc. The reflective sheet 510 is disposed between the optical film assembly 310 and the back plate 400, and is inclined at portions close to its edges for reflecting light of backlight sources generated by the backlight lamps 810. The backlight lamp 810 is supported and mounted on the back plate 400 and the reflective sheet 510 by the lamp socket 910, and disposed between the reflective sheet 510 and the optical film assembly 310. The backlight lamp 810 can be preferably cold cathode fluorescent lamp (CCFL), but not limited thereto. For example, the backlight lamp 810 also can be a light bar commonly constructed by a circuit board and light emitting diodes (LEDs). The optical film assembly 310 (such as a diffuser plate, a diffuser sheet, a prism plate and etc.) is disposed on the backlight lamps 810 and the lamp socket 910.

Referring still to FIGS. 2, 3 and 4, the back plate 400 at least comprises a back-plate mainbody 410, two bent structures 411 and two projection structures 412, wherein the back-plate mainbody 410 is disposed on a bottom of the LCD module 100, and the two bent structures 410 are integrally and symmetrically arranged on two opposite sides of the back-plate mainbody 410 for supporting the liquid crystal panel 110 and the optical film assembly 310, wherein each of the bent structures 411 comprises a first planar plate 411a, a second planar plate 411b and an inclined support plate 411c, wherein the first planar plate 411a is flush and connected with the back-plate mainbody 410, the second planar plate 411b is parallel to the first planar plate 411a, and two opposite sides of the inclined support plate 411c (i.e. an upper end and a lower end of the inclined support plate 411c in figures) are obliquely connected with an outer side of the first planar plate 411a (i.e. a right end of the first planar plate 411a in figures) and an inner side of the second planar plate 411b (i.e. a left end of the second planar plate 411b in figures), respectively. Therefore, the bent structures 411 forms an inverted V shape (and the bent structures 411 on the other side forms a V shape), wherein the shape can save material and be relatively stable.

As shown in FIG. 3, the reflective sheet 510 is disposed between the back-plate mainbody 410 of the back plate 400 and the optical film assembly 310, and the reflective sheet 510 is obliquely extended upward at portions close to its edges and then horizontally extended outward. Thus, a triangular support structure is defined between an inclined portion of the reflective sheet 510 and the bent structure 411 of the back plate 400, wherein the weight of the optical film assembly 310 is applied to the triangular support structure, so that the inclined portion of the reflective sheet 510 and the bent structure 411 of the back plate 400 are uneasy to occur sliding, shifting or deforming phenomena based on the support structure. In addition, the backlight lamp 810 is supported on the lamp socket 910 to be positioned on the back-plate mainbody 410, and the lamp socket 910 is disposed in a triangular space defined by the reflective sheet 510 and the bent structures 411. The reflective sheet 510 has a plurality of through holes, wherein the backlight lamp 810 can pass therethrough to be connected to the lamp socket 910.

Referring now to FIGS. 2, 3 and 4, in the embodiment of the present invention, the LCD module 100 further comprises a module frame 610, and the module frame 610 is used to cover and fix the liquid crystal panel 110. Each of the other two opposite sides of the back-plate mainbody 410 of the LCD module 100 is further formed with a projection structure 412, wherein the projection structure 412 is an integrated inverted U-shape bent structure and used to dispose a housing strip 710 thereon, and the projection structure 412 and the housing strip 710 are used to commonly support, clamp and fix the other two opposite sides of the optical film assembly 310. Meanwhile, the housing strip 710 is disposed between the optical film assembly 310 and the liquid crystal panel 110, and has a function similar to that of the spacer 210.

Figure 1:
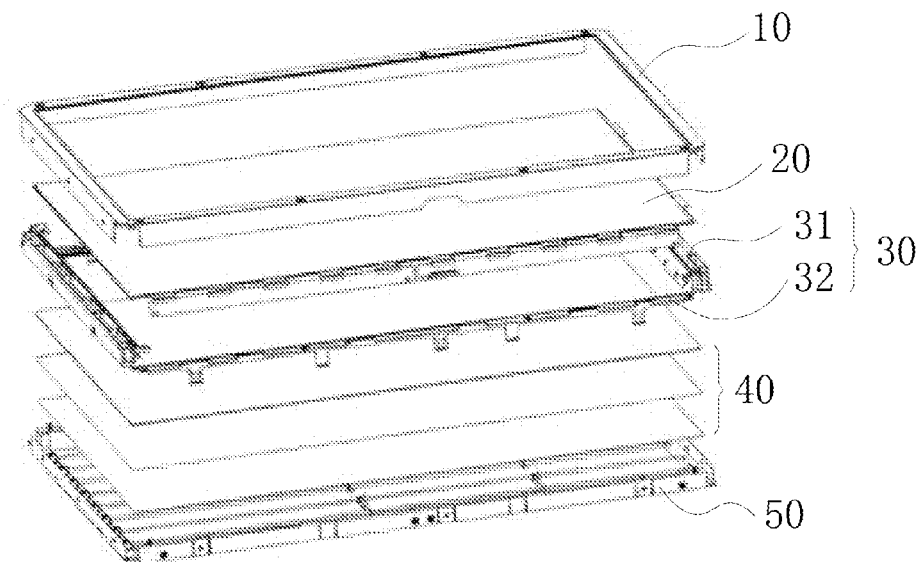
FIG. 1 is an exploded perspective view of a traditional LCD module having a separate-type backlight module.

As described above, according to the improved design of the back plate 400 of the present invention, the bent structures 411 formed on the opposite sides of the back-plate mainbody 410 for providing a support function is surely advantageous to omit the left/right housing strips in the traditional technology. In other words, the function provided by the two housing strip 710 and the two bent structures 411 of the back plate 400 is actually equal to a traditional separate-type or integral housing (i.e. the first housing strips 31 and the second housing strips 32 of the housing 30 as shown in FIG. 1). In contrast, the present invention can further simplify the structure of the backlight module, reduce the use of the housing strips, and enhance the stability thereof at the same time.

The present invention has been described with a preferred embodiment thereof and it is understood that many changes and modifications to the described embodiment can be carried out without departing from the scope and the spirit of the invention that is intended to be limited only by the appended claims.

The invention claimed is:

1. A liquid crystal display module, characterized in that: the liquid crystal display module comprises:
    a back plate comprising a back-plate mainbody and two bent structures, wherein the back-plate mainbody is disposed on a bottom of a backlight module, and the two bent structures are symmetrically arranged on two opposite sides of the back-plate mainbody;
    an optical film assembly disposed on the bent structures and supported by the bent structures;
    a reflective sheet disposed between the optical film assembly and the back-plate mainbody, wherein the reflective sheet is obliquely extended upward at portions close to its edges and then horizontally extended outward, wherein a triangular support structure is defined between an inclined portion of the reflective sheet and one of the bent structures of the back plate; and
    a liquid crystal panel disposed on the optical film assembly.

2. The liquid crystal display module according to claim 1, characterized in that: the liquid crystal display module further comprises a module frame, and the module frame is used to fix the liquid crystal panel.

3. The liquid crystal display module according to claim 2, characterized in that: each of the bent structures comprises a first planar plate, a second planar plate and an inclined support plate, wherein the first planar plate is flush and connected with the back-plate mainbody, the second planar plate is parallel to the first planar plate, and the inclined support plate is obliquely connected to an outer side of the first planar plate and an inner side of the second planar plate.

4. The liquid crystal display module according to claim 1, characterized in that: each of the other two opposite sides of the back-plate mainbody further comprises a projection structure which is provided with a housing strip, and the projection structure and the housing strip is used to clamp the optical film assembly.

5. The liquid crystal display module according to claim 1, characterized in that: further comprising at least one backlight lamp disposed between the reflective sheet and the optical film assembly.

6. The liquid crystal display module according to claim 5, characterized in that: the backlight lamp is supported on a lamp socket to be positioned on the back-plate mainbody, and the lamp socket is disposed in a space defined by the reflective sheet and the bent structures.

7. A backlight module, characterized in that: the backlight module comprises:
    a back plate comprising a back-plate mainbody and two bent structures, wherein the back-plate mainbody is disposed on a bottom of the backlight module, and the two bent structures are symmetrically arranged on two opposite sides of the back-plate mainbody;
    an optical film assembly disposed on the bent structures and supported by the bent structures; and
    a reflective sheet disposed between the optical film assembly and the back-plate mainbody, wherein the reflective sheet is obliquely extended upward at portions close to its edges and then horizontally extended outward, wherein a triangular support structure is defined between an inclined portion of the reflective sheet and one of the bent structures of the back plate.

8. The backlight module according to claim 7, characterized in that: each of the bent structures comprises a first planar plate, a second planar plate and an inclined support plate, wherein the first planar plate is flush and connected with the back-plate mainbody, the second planar plate is parallel to the first planar plate, and the inclined support plate is obliquely connected to an outer side of the first planar plate and an inner side of the second planar plate.

9. The backlight module according to claim 7, characterized in that: each of the other two opposite sides of the back-plate mainbody further comprises a projection structure which is provided with a housing strip, and the projection structure and the housing strip is used to clamp the optical film assembly.

10. The backlight module according to claim 7, characterized in that: further comprising at least one backlight lamp disposed between the reflective sheet and the optical film assembly.

11. The backlight module according to claim 10, characterized in that: the backlight lamp is supported on a lamp socket to be positioned on the back-plate mainbody, and the lamp socket is disposed in a space defined by the reflective sheet and the bent structures.

* * * * *